(12) United States Patent
Yamagishi

(10) Patent No.: US 7,167,724 B2
(45) Date of Patent: Jan. 23, 2007

(54) CONTROL APPARATUS AND CONTROL METHOD USING MOBILE COMMUNICATION TERMINAL

(75) Inventor: Junichi Yamagishi, Taito-ku (JP)

(73) Assignee: Unirec Co., Ltd., Tokyo (JP)

( * ) Notice: Subject to any disclaimer, the term of this patent is extended or adjusted under 35 U.S.C. 154(b) by 282 days.

(21) Appl. No.: 10/074,137

(22) Filed: Feb. 12, 2002

(65) Prior Publication Data

US 2003/0153305 A1 Aug. 14, 2003

(51) Int. Cl.
- *A63F 9/24* (2006.01)
- *H04M 1/00* (2006.01)
- *H04Q 7/20* (2006.01)

(52) U.S. Cl. .................. 455/556.1; 455/408; 455/411; 455/426.1; 463/29; 463/39; 463/41; 463/42

(58) Field of Classification Search ............... 455/406, 455/414.3, 414.1; 705/65; 700/94; 463/41, 463/43

See application file for complete search history.

(56) References Cited

U.S. PATENT DOCUMENTS

| | | | | |
|---|---|---|---|---|
| 6,233,603 B1* | 5/2001 | Matsuhashi et al. | ........ | 709/203 |
| 6,468,162 B1* | 10/2002 | Nakamura | .................... | 463/43 |
| 6,554,707 B1* | 4/2003 | Sinclair et al. | ................ | 463/39 |
| 6,695,702 B1* | 2/2004 | Morita | ......................... | 463/41 |
| 6,846,238 B1* | 1/2005 | Wells | .......................... | 463/39 |
| 2001/0053944 A1* | 12/2001 | Marks et al. | .................. | 700/94 |
| 2002/0082076 A1* | 6/2002 | Roser et al. | ................... | 463/25 |
| 2002/0116615 A1* | 8/2002 | Nguyen et al. | .............. | 713/168 |
| 2005/0101383 A1* | 5/2005 | Wells | .......................... | 463/39 |

FOREIGN PATENT DOCUMENTS

| | | |
|---|---|---|
| JP | 05-146555 | 6/1993 |
| JP | 07-171240 | 7/1995 |

* cited by examiner

*Primary Examiner*—Fan Tsang
*Assistant Examiner*—Lisa Hashem
(74) *Attorney, Agent, or Firm*—Jordan and Hamburg LLP

(57) ABSTRACT

This invention enables a play without using coins and easy collection of fee. An control apparatus of this invention comprises a play portion which stores play information and enables a play by inputting personal information, an input portion to which a mobile communication terminal is connected detachably in order to input personal information and a control portion which reads a subscriber number as the personal information from the mobile communication terminal connected to the input portion, makes a call to the information service center and enables a play by the play portion. The information service center bill corresponding to the play through mobile communication network or stationary communication network.

18 Claims, 7 Drawing Sheets

CONTROL APPARATUS AND CONTROL METHOD USING MOBILE COMMUNICATION TERMINAL

BACKGROUND OF THE INVENTION

1. Field of the Invention

The present invention relates to a control apparatus and control method using mobile communication terminal for controlling a game machine or the like at an amusement place.

2. Description of the Related Art

When a person plays a game machine at an amusement place or the like, conventionally, he must put a coin into a slot in the game machine. If he wants to play the game with such a machine several times, he needs several coins. It is worrisome that he always carry plural coins and it is also worrisome that he must exchange bill to coins with an exchanger when he wants to play the game.

According to Japanese Patent Application Laid-Open NO. H5-146555 and Japanese Patent Application Laid-Open No. H7-171240 disclosed recently, people can play the game with a pre-paid card, member's card or credit card even if he has no coin.

In recent years, the mobile communication means such as the mobile phone and the Internet have been developed rapidly and generality of those communication means has been demanded to be intensified.

SUMMARY OF THE INVENTION

An object of the present invention is to provide a control apparatus and a control method using the mobile communication terminal, which allows a play to be enjoyed fully under an easy control.

To achieve the above object, a first aspect of the present invention provides a control apparatus comprising: a play portion enabling a play according to personal information; an input portion for inputting personal information from a mobile communication terminal; and a control portion which makes a call to an accounting center based on the input of personal information through the mobile communication terminal and enables the play by the play portion based on the call, wherein the accounting center bills corresponding to the play.

A second aspect of the present invention provides a control apparatus comprising: a play portion which stores play information and enables a play according to personal information; an input portion for inputting personal information from a mobile communication terminal; and a control portion which makes a call to an information service center based on the input of personal information through the mobile communication terminal and enables the play by the play portion based on the call, wherein the information service center bills corresponding to the play.

A third aspect of the present invention provides a control apparatus using the mobile communication terminal according to the second aspect, wherein the information service center stores newly published play information and dispatches the newly published information corresponding to the call and the control portion receives the newly published information and outputs the newly published information prior to the play.

A fourth aspect of the present invention provides a control apparatus comprising: an amusement place allowing an entry according to personal information; an input portion for inputting personal information from a mobile communication terminal; and a control portion which makes a call to an information service center based on the input of personal information through the mobile communication terminal and allows an entry into the amusement place based on the call, wherein the information service center bills corresponding to the entry.

A fifth aspect of the present invention provides a control apparatus comprising: a release portion capable of releasing charged play pieces based on personal information; an input portion for inputting personal information from a mobile communication terminal; and a control portion which makes a call to an information service center based on the input of personal information through said mobile communication terminal and allows the release by the release portion based on the call, wherein the information service center bills corresponding to the release.

A sixth aspect of the present invention provides a control apparatus using the mobile communication terminal according to any one of the second to fifth aspect further comprising: an identification number input portion for inputting an identification number as personal information, wherein the control portion makes a call to the information service center if the inputted identification number coincides with personal information.

A seventh aspect of the present invention provides a control method comprising: a play portion which stores play information and enables a play according to personal information; an input portion for inputting personal information from a mobile communication terminal; and a control portion which makes a call to an information service center based on the input of personal information through the mobile communication terminal and enables the play by the play portion based on the call, wherein the information service center bills corresponding to the play.

An eighth aspect of the present invention provides a control apparatus comprising: a play portion enabling a play according to personal information; an input portion for inputting personal information from a mobile communication terminal which can be connected to the Internet; and a control portion which makes a call to an Internet service provider based on an input of personal information through the mobile communication terminal and allows a play by the play portion based on the call, wherein the Internet service provider bills corresponding to the play.

A ninth aspect of the present invention provides a control apparatus further comprising: an information terminal unit which makes a call to an Internet service provider based on an input of personal information from the mobile communication terminal and enables operation of an Internet information based on the call, wherein the Internet service provider bills corresponding to the operation.

A tenth aspect of the present invention provides a control apparatus using the mobile communication terminal according to any one of the first to fifth, eighth, ninth aspect wherein the mobile communication terminal makes the input by radio.

According to the first aspect of the invention, if the player inputs his personal information into the input portion from the mobile communication terminal, the control portion makes a call to the accounting center according to an input of the personal information through the mobile communication terminal and enables a play in the play portion based on that call. Therefore, the player can play the game by the play portion only by operating the mobile communication terminal and is released from a worry of using coins, so that he can enjoy the game fully. Further, the accounting center can bill corresponding to the play. Additionally, freedom of setting for accounting can be intensified.

According to the second aspect of the invention, if the player inputs his personal information into the input portion from the mobile communication terminal, the control portion makes a call to the information service center according to an input of the personal information through the mobile communication terminal and enables a play in the play portion based on that call. Therefore, the player can play the game by the play portion only by operating the mobile communication terminal and is released from a worry of using coins, so that he can enjoy the game fully. Further, the information service center can bill corresponding to the play. Additionally, freedom of setting for billing can be intensified.

According to the third aspect, in addition to an effect of the second aspect, the information service center transmits newly published game information corresponding to the call and the control portion receives the newly published information and outputs it before the play is started, so as to supply the player with such newly published game information.

According to the fourth aspect of the invention, if the player inputs his personal information into the input portion from the mobile communication terminal, the control portion makes a call to the information service center according to an input of the personal information through the mobile communication terminal and allows an entry into the amusement place based on that call. Therefore, the player can enter the amusement place only by operating the mobile communication terminal. Further, the information service center can bill corresponding to the entry. Additionally, freedom of setting for billing can be intensified.

According to the fifth aspect of the invention, if the player inputs his personal information into the input portion from the mobile communication terminal, the control portion makes a call to the information service center according to an input of the personal information through the mobile communication terminal and enables release of the release portion based on that call. Therefore, the player can receive the release of the charged play objects only by operating the mobile communication terminal. Further, the information service center can bill corresponding to the release of the charged play objects. Additionally, freedom of setting for billing can be intensified.

According to the sixth aspect of the present invention, in addition to the effects of any one of the second to fifth aspects, because the identification number is inputted as the personal information, other persons than owner of the mobile communication terminal cannot use the mobile communication terminal, so that a more proper billing can be made.

According to the seventh aspect of the invention, if the player inputs his personal information into the input portion from the mobile communication terminal, the control portion makes a call to the information service center according to an input of the personal information through the mobile communication terminal and enables a play in the play portion based on that call. Therefore, the player can play the game by the play portion only by operating the mobile communication terminal and is released from a worry of using coins, so that he can enjoy the game fully. Further, the information service center can bill corresponding to the play. Additionally, freedom of setting for billing can be intensified.

According to the eighth aspect of the invention, if personal information is inputted to the input portion from the mobile communication terminal which can be connected to the Internet, the control portion makes a call to an Internet service provider according to an input of the personal information through the mobile communication terminal and enables a play in the play portion based on that call. Therefore, the player can play the game by the play portion only by operating the mobile communication terminal and is released from a worry of using coins, so that he can enjoy the game fully. Further, the Internet service provider can bill corresponding to the play. Additionally, freedom of setting for billing can be intensified.

According to the ninth aspect of the invention, if personal information is inputted to the input portion from the mobile communication terminal, the information terminal unit makes a call to an Internet service provider according to an input of the personal information through the mobile communication terminal and enables the Internet information to be operated based on that call. Therefore, the player can operate the Internet information only by operating the mobile communication terminal and is released from a worry of using coins, so that he can enjoy the game fully. Further, the Internet service provider can bill corresponding to the operation of the Internet information. Additionally, freedom of setting for billing can be intensified.

According to the tenth aspect, in addition to the effects of any one of the first to fifth, eighth and ninth aspect of the present invention, the input of the personal information into the input portion can be carried out by radio through the mobile communication terminal so that the necessary operation can be carried out more easily.

DESCRIPTION OF THE PREFERRED EMBODIMENTS (First Embodiment)

Figure 1:
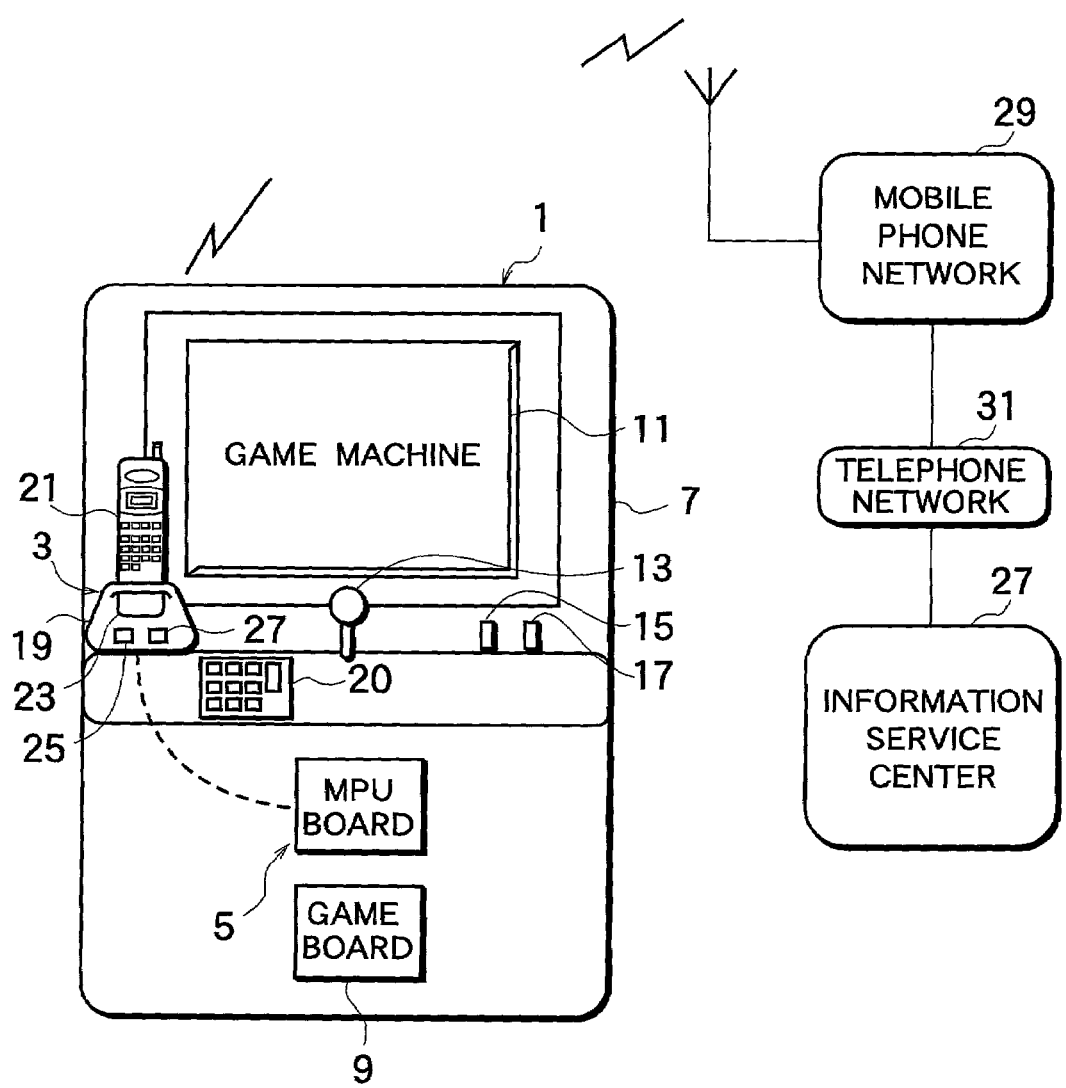
FIG. 1 is a block diagram according to a first embodiment of the present invention.

FIG. 1 shows a block diagram of a control apparatus using a mobile communication terminal according to the first embodiment of the present invention. This control apparatus using the mobile communication terminal comprises a play portion 1, an input portion 3 and a control portion 5. The play portion 1 comprises a game board 9 within its housing 7 for storing games as play information. The housing 7 comprises a screen 11 for outputting a memorized game, so that a player can enjoy the game with an operation knob 13 or the like while watching the screen 11.

The housing 7 of the play portion 1 has coin slots 15, 17. The coin slot 15 is a slot for putting for example, 100-yen coin and by putting a 100-yen coin into the slot, game of unit time, for example, a time can be enjoyed. The coin slot 17 is a slot for putting for example, 500-yen coin and by putting a 500-yen coin, for example, the game can be enjoyed five times. Start of this game is executed under control of a game credit switch, which will be described later.

The housing 7 of the play portion 1 has a numeric pad 20 as an identification number input portion. An identification number inputted through the numeric pad 20 is inputted to the control portion 5. Input of the identification number can be executed through a mobile communication terminal 21. In this case, the numeric pad 20 is not necessary and the mobile communication terminal 21 serves as an identification number input portion.

The input portion 3 is used for inputting personal information through the mobile communication terminal 21 and comprised of a holder 19 fixed to the housing 7. The holder 19 has a connection port on its top portion and plural kinds of connectors are disposed within the connection port so as to correspond to various kinds of the mobile phone, Personal Handyphone System (PHS), and the like. Therefore, any kind of the mobile communication terminals 21 is acceptable.

A status indicating portion 23 is provided in a top portion of the front face of the holder 19 and game start approval buttons 25, 27 are provided in its lower portion. One game start approval button 25 corresponds to the coin slot 15 and approves a single game. The other game start approval button 27 corresponds to the coin slot 17 and approves for example five-time games. If people want to play games twice, he can do it by pressing the game start approval button 25 after a game is finished. The same thing can be said of three times or four times of the game. If he wants to play the game six times, he can do it by pressing the game start approval button 25 after the five-time games started with the game start approval button 27 are finished, so that he can play the games totaling six times. The same thing can be said if he wants to play the game seven times. Meanwhile, other kinds or combination of the buttons may be employed.

The control portion 5 is composed of a MPU board and reads an subscriber number as personal information from the mobile communication terminal 21 connected to the input portion 3. Then, it makes a call to information service center 28 and enables playing a game in the play portion 1 by at least a unit time. Reading of the subscriber number will be described later.

The information service center 28 receives a number corresponding to at least the aforementioned unit times through a mobile phone network 29 as mobile communication network and through telephone network 31 as stationary communication network.

This embodiment contains, for example, a number corresponding to a single game and a number corresponding to five-time games. When the number corresponding to the single game is received, a fee of single-time game is billed and when the number corresponding to five-time games is received, a fee of the five-time game is billed. Therefore, the information service center serves as an accounting center according to this embodiment.

Figure 2:
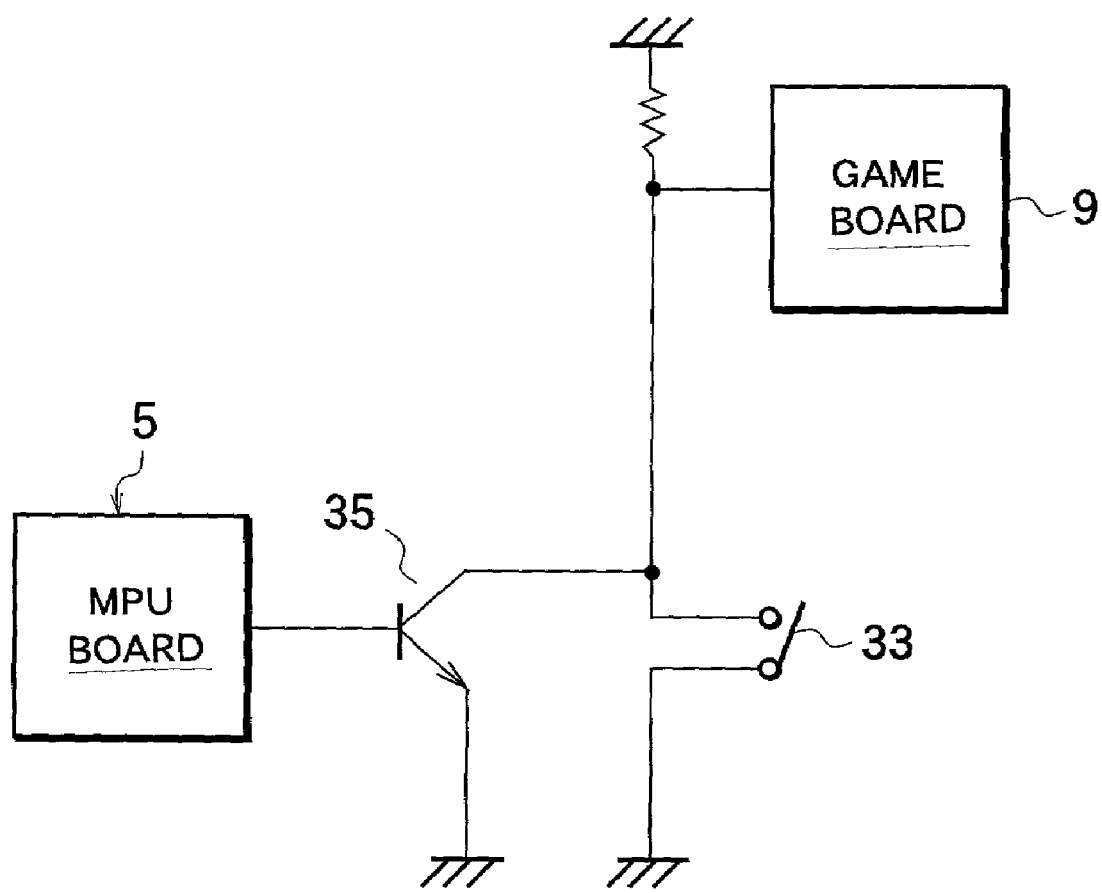
FIG. 2 is a circuit structure diagram of a game start approval switch of the first embodiment.

FIG. 2 shows a circuit configuration of game credit switches 33, 35. The game credit switch 33 is a mechanical switch, which if a 100-yen coin is put into the coin slot 15, is turned on a single time. If a 500-yen coin is put into the coin slot 17, this switch is turned on again after a first game is finished, so that a next game is started and the switch is turned on successively five times in total.

The game credit switch 35 is composed of a transistor and its gate is connected to the aforementioned MPU board 5. Therefore, when the game start approval button 25 is pressed, a signal is transmitted from the MPU board 5 to the game credit switch 35 a single time, so that the game credit switch 35 is powered on thereby allowing to execute a single game. Further, if the game start approval button 27 is pressed, signals are transmitted five times successively from the MPU board 5, thereby allowing to execute the game five times.

Figure 3:
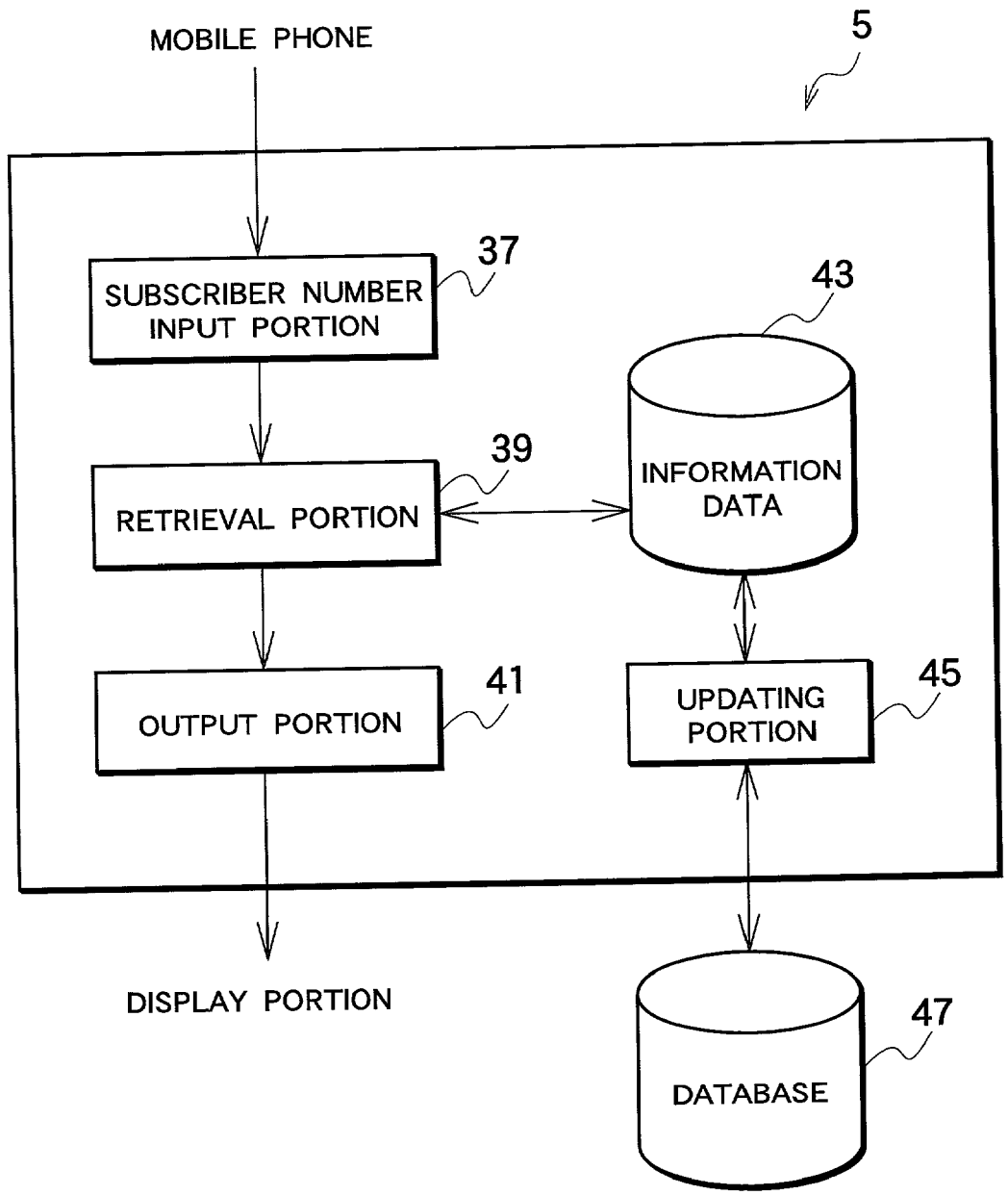
FIG. 3 is a block diagram of a control portion of the first embodiment.

FIG. 3 shows a block diagram for subscriber number reading in the control portion 5. The control portion 5 comprises a telephone number input portion 37, a retrieval portion 39, an output portion 41, information data 43 and an updating portion 45.

The information data 43 stores an subscriber number, address and name of a subscriber of the mobile communication terminal 21. The information data 43 can be updated with information data from a database 47 by the updating portion 45. The database 47 is possessed by a provider of the mobile communication network 29 and if a new person subscribes or other person cancels his subscription contract, the corresponding information is always stored in the database 47. Therefore, the information data 43 can always possess updated information data.

First, if a person inserts his mobile communication terminal 21 into the connection port of the holder 19 at an amusement place as shown in FIGS. 1, 3, serial communication is carried out with the control portion 5 so as to read his subscriber number and the like. That is, personal information is inputted to the input portion 3.

Further in detail, as shown in FIG. 3, the telephone number input portion 37 acquires a subscriber number from the holder 19 (mobile phone) and the acquired number is inputted to the retrieval portion 39. The retrieval portion 39 retrieves information of the information data 43 according to the acquired subscriber number and if there is data corresponding to the subscriber number, outputs it to the output portion 41.

The output portion 41 outputs to the status indicating portion 23 of the holder 19 and the status indicating portion 23 indicates a subscriber number, address and name. The game player recognizes this status indicating portion 23.

Here, a voice generating portion outputs a message saying, for example, "Enter your identification number" under a control of the control portion 5. Then, the game player inputs his identification number through the numeric pad 20. The inputted identification number is recognized according to information from the information data 43 by the control portion 5. If this identification number is different from a number of a owner of the mobile communication terminal 21, the voice generating portion outputs a message saying, for example, "A wrong number is entered". Therefore, the game player can input a proper identification number.

Next, if the game start approval button 25 or 27 is pressed, if the identification number is right, the control portion 5 makes a call corresponding to the approval button 25 or 27. Further, the game credit switch 35 is turned on as shown in FIG. 2, so that a game is outputted to the screen 11 and the game player can play the game with the operation knob 13.

By receiving a number corresponding to the aforementioned call, the information service center 28 bills corresponding to execution times of the game. A fee is collected by an enterpriser of the telephone network 31 instead and an amount minus communication fee and agent fee is paid to the information service center 28. Then, a controller of the play portion 1 can receive an amount minus commission of the information service center 28 therefrom. The player can enjoy a game easily without using coins, pre-paid card or credit card and the like.

The information service center 28 stores game information, for example, newly published game information and transmits the newly published game information corresponding to the call. The MPU board of the control portion 5 receives for example, the newly published game information and outputs it on the screen 11 before the game is started. Therefore, the player can be notified of the newly published game information immediately. This newly published game information may be so constructed to be displayed at any timing before or after the game start approval button 25 or 27 is pressed.

It is permissible to so construct that the identification number does not have to be inputted by omitting the numeric pad 20 which is the identification number input portion. Although according to the above-described embodiment, billing is made depending on a game frequency while the fee of a game is specified, it is permissible to so construct that billing is made depending on time for using the play portion 1. That is, freedom of billing setting can be intensified.

Some amusement place employs a system in which in a specified time interval, a person pays an entrance fee when he enters there and he can play any game machine without charge. The above-described control apparatus using the mobile communication terminal can be applied to such a system.

If explaining with the reference numerals although not shown, the amusement place is provided with a gate or the like at an entrance, which allows a person to enter at least unit times by inputting his personal information. Then, like described above, the input portion 3, to which the mobile communication terminal 21 is connected detachably, is provided on the gate of the amusement place. Consequently, a subscriber number, which is personal information, is read from the mobile communication terminal 21 connected to the input portion 3 and when the identification number is inputted properly, the approval button is pressed so as to make a call to the information service center 28. As a result, entrance of the person into the amusement place for the unit times is allowed by the control portion 5.

The player can enjoy any game machine freely although within a limited time. The information service center 28 receives a number corresponding to at least the unit times through the mobile phone network 29 and the telephone network 31 so that it can bill depending on the entrance of that player. The fee collection system is the same as described before.

Although according to this embodiment, a fee per an entrance is specified and billing is made depending on entrance frequency, it is permissible to so construct that billing is made depending on time consumed by the player at the amusement place.

(Second Embodiment)

Figure 4:
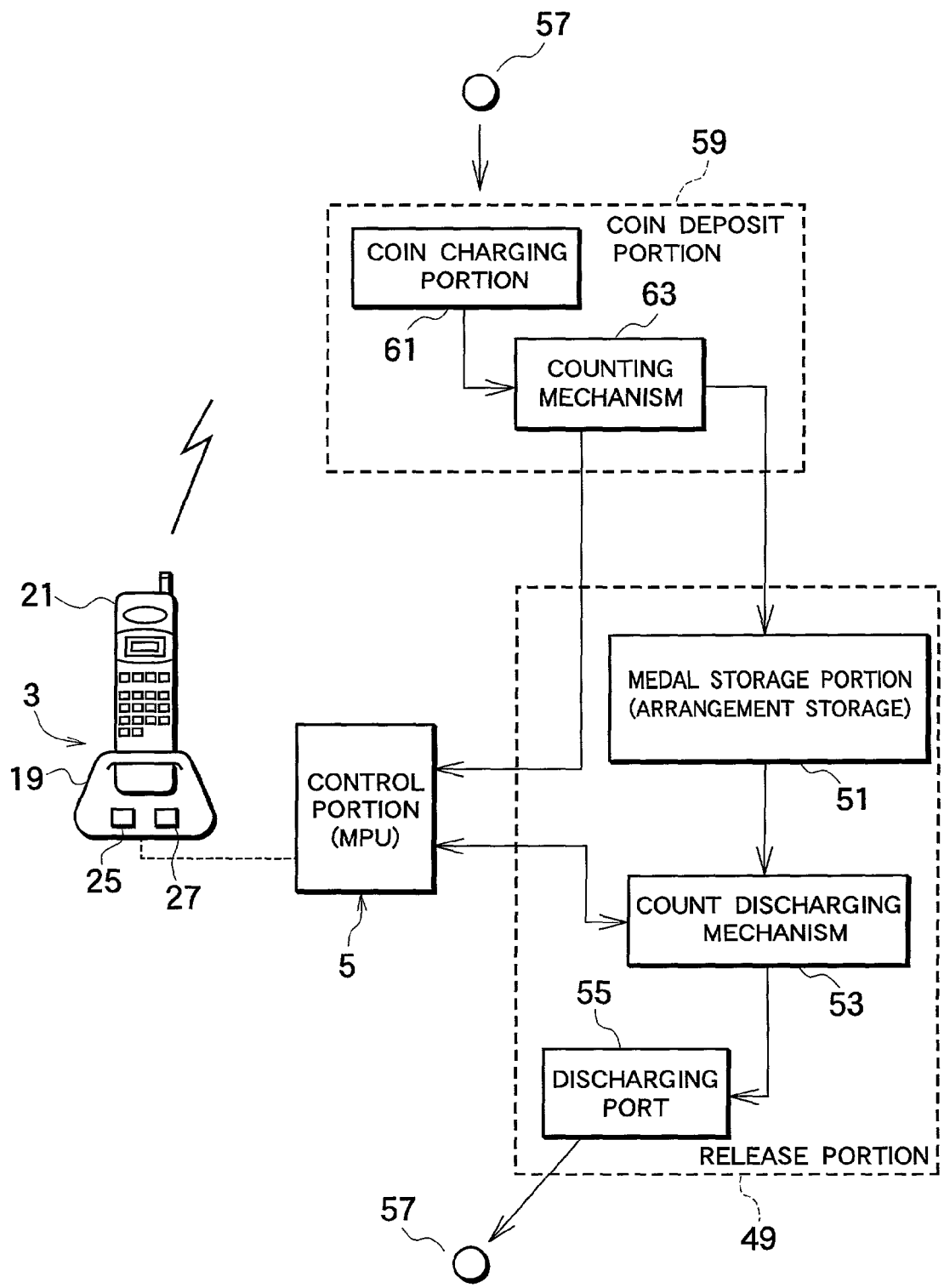
FIG. 4 is a block diagram whose part is omitted according to a second embodiment of the present invention.

FIG. 4 shows a second embodiment of the present invention. Like reference numerals are attached to components corresponding to the first embodiment.

According to this embodiment, the present invention is applied to medal control of a medal play machine as a control for charged play pieces. According to this embodiment, the control apparatus comprises a discharging portion 49, an input portion 3 and a control portion 5.

The aforementioned release portion 49 includes a medal storage portion 51, a count discharging mechanism 53 and a release port 55. The medal storage portion 51 arranges and stores received medals. The count discharging mechanism 53 discharges a specified number of medals according to an instruction from the control portion 5 and inputs the number of discharged medals into the control portion 5. The release port 55 releases medals 57 discharged from the count discharging mechanism 53. That is, the count discharging mechanism 53 counts a discharging number for unit times, for example, 100 medals and according to a signal from the control portion 5, the release portion 49 releases medals received from the medal storage portion 51.

The structures of the input portion 3 and the control portion 5 are substantially the same as the first embodiment. According to this embodiment, the approval button 25 of the input portion 3 approves release of medals for a single time and the approval button 27 approves release of medals for five times. Therefore, when the approval button 25 is pressed, a quantity of medals released for a single time, for example, 100 medals, are released from the release port 55. When the approval button 27 is pressed, a quantity of medals for five times, for example, 500 medals are released from the release port.

Although, the other structure is the same as the first embodiment. The identification number input portion may be provided like the first embodiment or may be omitted.

Therefore, if the mobile communication terminal 21 is connected to the input portion 3, the control portion 5 reads a subscriber number as personal information. If the inputted identification number is right when the approval button 25 or 27 is pressed, the control portion 5 makes a call to the information service center 28 so that a predetermined number of medals corresponding to the button 25, 27 can be obtained from the release port 55.

The information service center 28 receives a number corresponding to a single time ordered when the button 25 is pressed or five times ordered when the button 27 is pressed through the mobile phone network 29 and the telephone network 31 and bill corresponding to the number of released medals from the release portion 49. The fee collection system is the same as the first embodiment. Therefore, the player can obtains a necessary number of the medals 57 without using coins, prepaid card or the like.

A charged play object to which this embodiment is applied can be applied to Pachinko (pinball) or the like of Pachinko game machine (pinball game machine) as well as the medals of the medal play machine.

(Third Embodiment)

Figure 5:
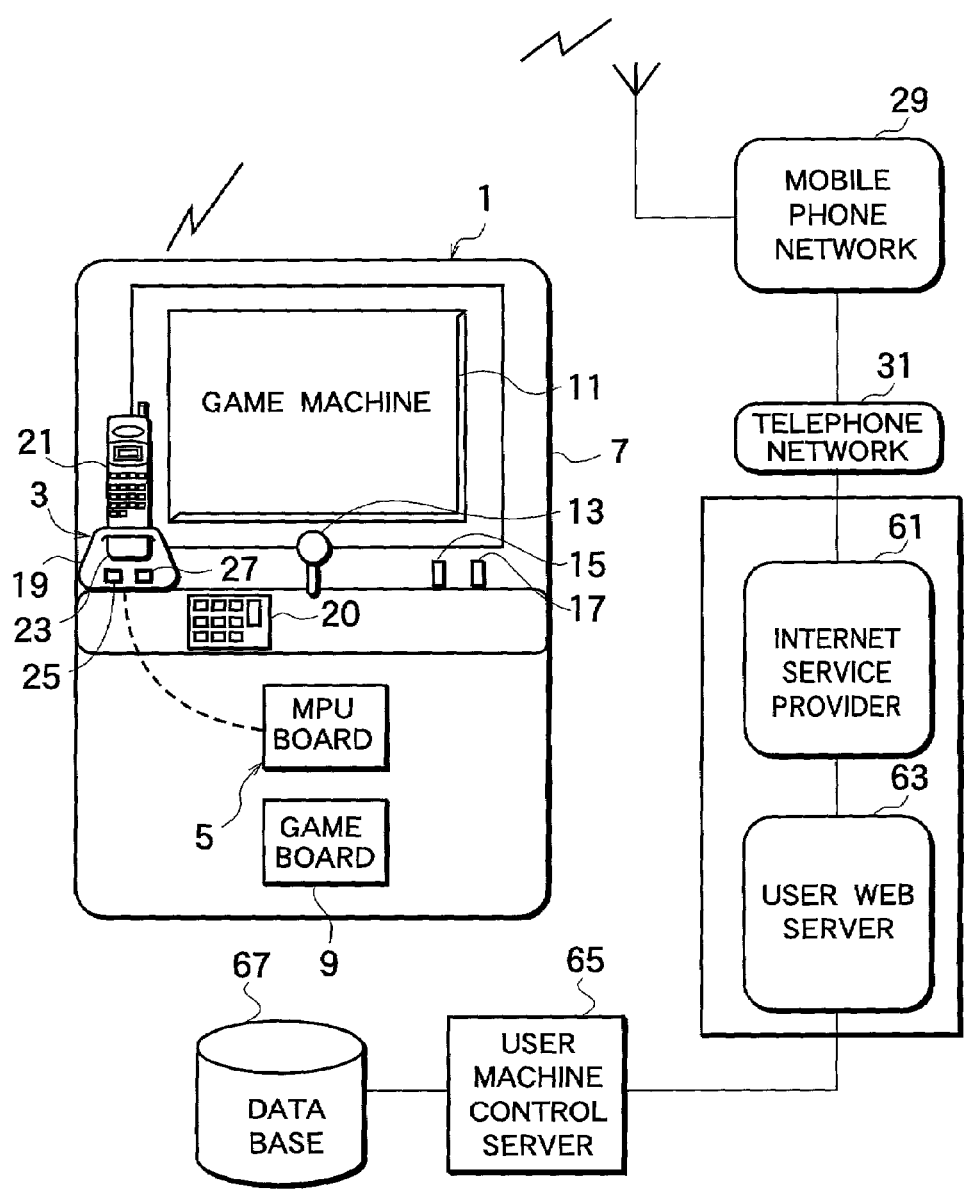
FIG. 5 is a block diagram according to a third embodiment of the present invention.

FIG. 5 shows a third embodiment of the present invention. Like reference numerals are attached to components corresponding to the first embodiment.

Although the first embodiment shown in FIG. 1 employs the information service center 28, this embodiment uses an Internet service provider 61 as shown in FIG. 5.

That is, a telephone network 31 is connected to the Internet service provider 61 and the Internet service provider 61 is connected to an integrated user Web server 63. The user Web server 63 is connected to a user machine control server 65. The user machine control server 65 is provided with a database 67. The database 67 memorizes fee setting tables corresponding to each of machine numbers of plural machines which are the play portions 1. This fee setting table always stores information corresponding to increase/decrease of the game machines in the database 67. Therefore, the database 67 can always possess updated information data. The control portion 5 memorizes a machine number of each game machine which is the play portion 1. Further, the mobile communication terminal 21 for use in this embodiment needs to be connected to the Internet.

Before the player starts a game, he needs to make contract with an Internet service provider 61. This contract is made by notifying the Internet service provider 61 of a credit number or the like of his credit card through the mobile communication terminal 21. As a result, the Internet service provider 61 issues a provider ID and a password. This provider ID and password are displayed on a display portion of the mobile communication terminal 21 or the status indicating portion 23. When he makes contract with the Internet service provider 61, input of his identification number or the like can be carried out through the numeric pad 20 or the mobile communication terminal 21.

If the player inserts the mobile communication terminal 21 into the connection port of holder 19 at the amusement place, serial communication is carried out with the control portion 5 so as to read a subscriber number. An issued password is inputted by the mobile communication terminal 21. If this password is inputted, a call is made and at the same time, a machine number is read out from the control portion 5 and transmitted to the mobile phone network 29 through the mobile communication terminal 21.

The transmitted machine number is transmitted to the telephone network 31, the Internet service provider 61, the user Web server 63 and the user machine control server 65. The user machine control server 65 reads out a fee setting table corresponding to the machine number, by the database 67. The fee setting table read out by the user machine control server 65 is transmitted to the Internet service provider 61 through the user Web server 63.

When this transmission is executed, the Internet service provider 61 transmits an approval signal to the mobile communication terminal 21 connected to the holder 19 through the telephone network 31 and the mobile phone network 29. This approval signal is inputted to the control portion 5. If the player presses the game start approval button 25 or 27, a signal corresponding to a game frequency specified by this approval button 25, 27 is transmitted to the Internet service provider 61 and a ticket according to the fee setting table is issued. The game credit switch 35 is turned on like FIG. 2, so that the game is outputted to the screen 11, thereby allowing the game to be executed through the operation knob 13.

The Internet service provider 61 functions as an accounting center so as to bill corresponding to the ticket issued according to the fee setting table. The fee is collected by Internet service provider 61's sending a bill to a player and an amount minus an agent fee and the like is paid to the machine control user of the play portion 1. Therefore, the player can enjoy a game easily without using any coin.

Although according to this embodiment, a fee of a single game is specified and billing is made depending on a game frequency executed, it is permissible to so construct that the billing is made depending on use time of the play portion 1. Further, it is permissible to so construct that newly published information is transmitted when the password is inputted.

(Fourth Embodiment)

Figure 6:
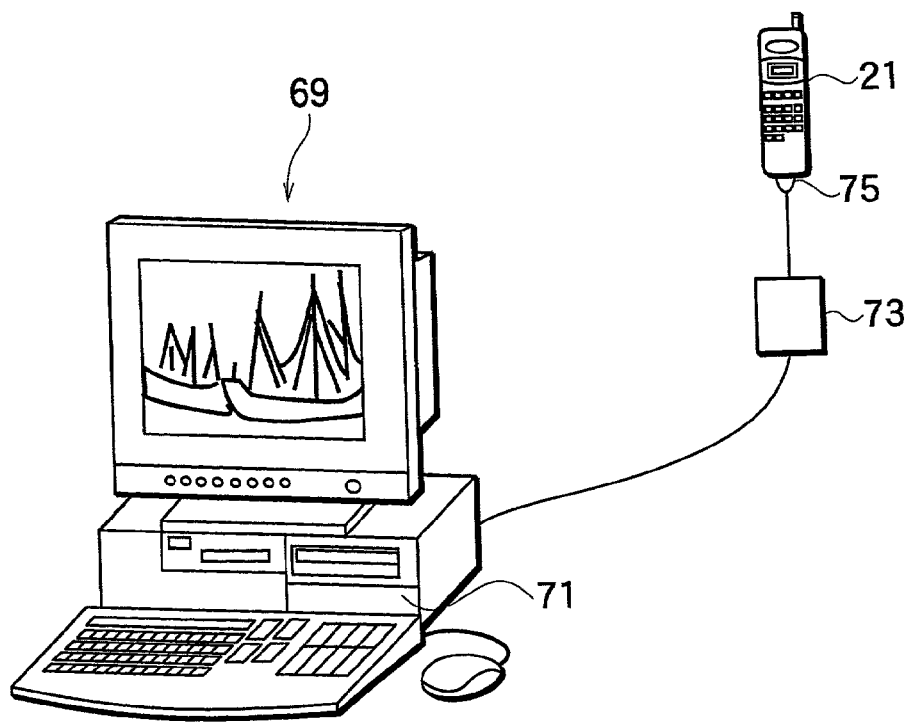
FIG. 6 is a perspective view of a desktop personal computer according to a fourth embodiment of the present invention.
Figure 7:
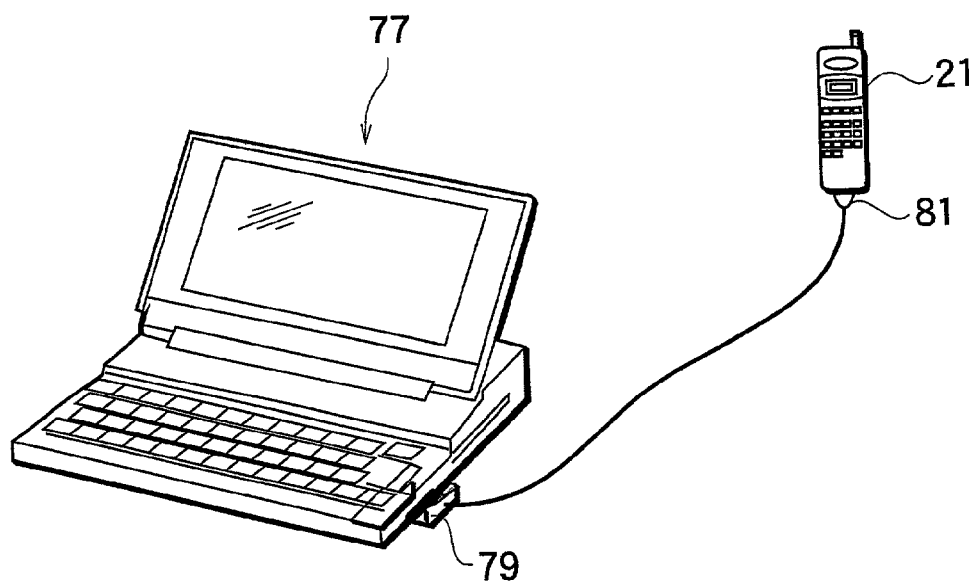
FIG. 7 is a perspective view of a laptop computer according to the fourth embodiment of the present invention.

FIGS. 6, 7 show the fourth embodiment of the present invention. According to this embodiment, billing is made corresponding to operating time when a game software, word processor software or spread sheet software, which belongs to the Internet information, is operated through a personal computer provided at an amusement place or the like.

FIG. 6 shows a case where this embodiment is applied to a desktop personal computer 69 as an information terminal. The desktop personal computer 69 is provided with a serial communication port 71, to which a conversion adaptor 73 is connected. This conversion adaptor 73 converts physical connecting condition and logical connecting condition. The mobile communication terminal 21 is connected to a connection terminal 75 extended from this conversion adaptor 73.

FIG. 7 shows a case where this embodiment is applied to a laptop computer 77 as an information terminal. This laptop computer 77 is provided with a PCMCIA card 79 and the mobile communication terminal 21 is connected to the connection terminal 81.

In cases of FIGS. 6, 7, any game stored in the game machine is not carried out unlike the above-described embodiments, but a game software, word processor software, spread sheet software or the like, which is the Internet information, is executed through the desktop personal computer 69 or laptop computer 77. Such a game may be played among some people through the Internet. In this case, billing is made depending on use time or according to a fee specified per hour, for example, 100 yen per hour and the fee is collected.

If user operates the desktop personal computer 69 or laptop computer 77, he needs to make contract with an Internet service provider like the above-described embodiment. This contract is made by notifying of a credit number or the like of his credit card. Then, if his password is inputted through the mobile communication terminal 21 or a keyboard of the desktop personal computer 69 or the laptop computer 77, a call is made according to a subscriber number read from the mobile communication terminal 21. The computer is connected to the accounting center of the Internet service provider by this call so that an approval signal and an object program on the Internet are sent to the computer. Consequently, user of the desktop personal computer 69 or the laptop computer 77 can execute a game, word processing or spread sheet processing by operating the computer.

When this desktop personal computer 69 or the laptop computer 77 is operated, communication of the mobile communication terminal 21 is cut out temporarily. If the operation of the desktop personal computer 69 or the laptop computer 77 is terminated, the call is made again, so that time count is made at the accounting center of the Internet service provider to make a specified billing. The fee is collected by Internet service provider's sending a bill to the user of the desktop personal computer 69 or the laptop computer 77 and an amount minus an agent fee and the like is paid to a controller of the desktop personal computer 69 or the laptop computer 77. Therefore, this embodiment also allows the Internet game or the like to be enjoyed easily through the mobile communication terminal 21 and a corresponding fee to be collected easily.

Although according to the above-described embodiment, billing is made by counting use time of the information terminal, it is permissible to specify a fee of each of the game softwares, word processing softwares and spread sheet softwares and make bill depending on use time of the corresponding information.

(Fifth Embodiment)

Figure 8:
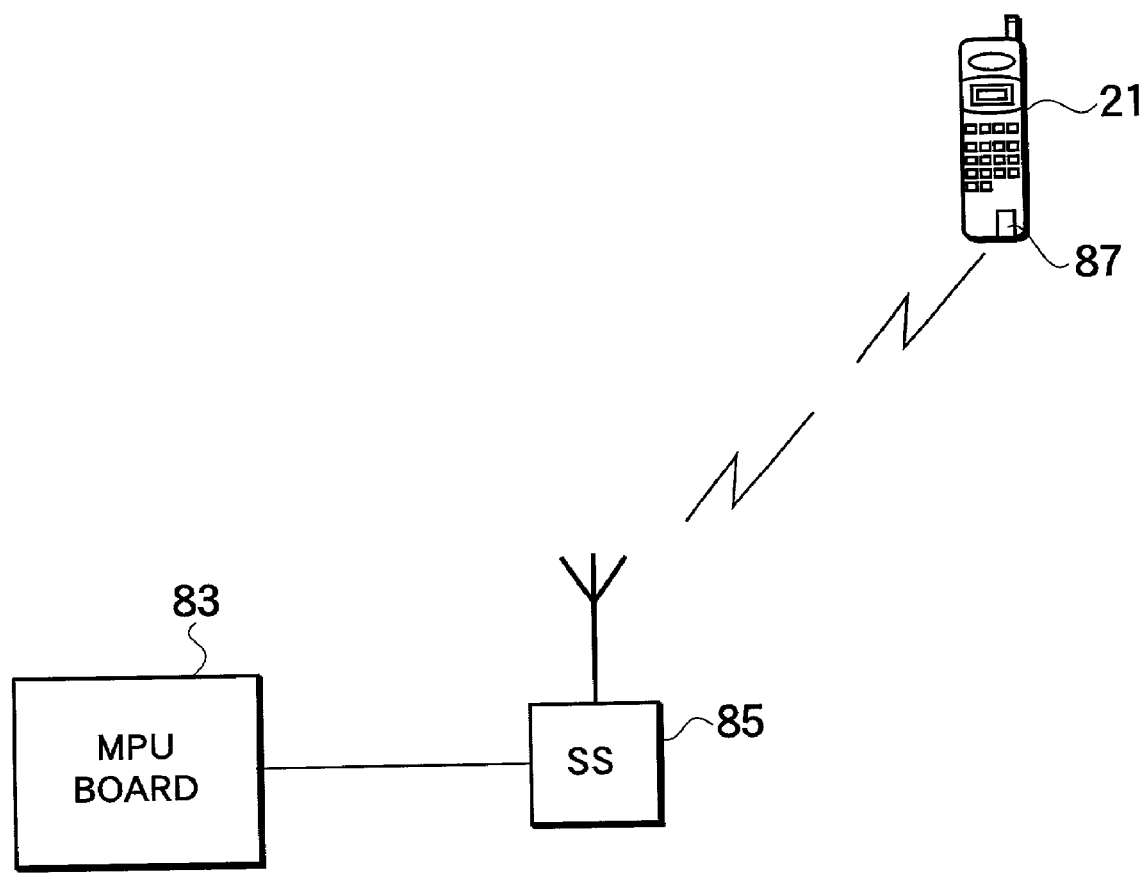
FIG. 8 is a block diagram according to a fifth embodiment of the present invention.

FIG. 8 shows the fifth embodiment of the present invention. Although according to the above embodiments, communication is made by connecting the mobile communication terminal directly to each apparatus, this may be replaced with radio communication mentioned in this embodiment.

As shown in FIG. 8, a radio terminal unit 85 is connected to a control portion 83 of each apparatus and a radio communication unit 87 is accommodated in the mobile communication terminal 21. This radio system belongs to weak SS(split spectrum diffusion) radio, which has been prevailing as Bluetooth.

If such a communication system is employed, inconvenience of placing the mobile communication terminal 21 in the holder 19 of the play portion 1 or the like or connecting it to the desktop personal computer 69 or the laptop computer 77 is eliminated thereby making it possible to operate the game machine or such computer software easily.

Although according to the above embodiment, certification of user is carried out by inputting his password or identification number, it is permissible to provide the mobile communication terminal 21 with a finger print verifying unit so as to certify the person by verifying his finger print.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. A control apparatus, using a mobile communication terminal, comprising:
    an accounting center storing a list of subscribers;
    a game play portion being separate from the mobile communication terminal wherein a game is played exclusively on said game play portion and not on the mobile communication terminal, said game play portion having at least a game start approval button, which enables a game play according to personal information;
    an input portion, for reading as input personal information exclusively provided by the mobile communication terminal, the personal information identifying a user intending to operate the game play portion; and
    a control portion disposed on said game play portion, said control portion identifying the user on the basis of the input of personal information, said control portion thereafter making a call via said mobile communication terminal to the accounting center; and
    responsive to the user being on the lists of subscribers and said game start approval button being operated, said control portion actuates a game credit switch to enable the game play by said game play portion,
    wherein said accounting center bills at a predetermined subsequent time corresponding to said call made by operating said game start approval button.

2. A control apparatus using the mobile communication terminal according to claim 1 wherein said mobile communication terminal makes said input by radio.

3. The control apparatus using the mobile communication terminal according to claim 1, wherein said input portion, having a connection port for inserting said mobile communication terminal, reads personal information from said mobile communication terminal inserted into said connection port.

4. A control apparatus, using a mobile communication terminal, comprising:
    an information service center storing a list of subscribers;
    a game play portion being separate from the mobile communication terminal wherein a game is played exclusively on said game play portion and not on the mobile communication terminal, said game play portion having at least a game start approval button, which stores game play information and enables a game play according to personal information;
    an input portion, for reading as input personal information exclusively provided by the mobile communication terminal, the personal information identifying a user intending to operate the game play portion; and
    a control portion disposed on said game play portion, said control portion identifying the user on the basis of the input of personal information, said control portion thereafter making call via said mobile communication terminal to the information service center; and
    responsive to the user being on the lists of subscribers and said game start approval button being operated, said control portion actuates a game credit switch to enable the game play by said game play portion;
    wherein said information service center bills at a predetermined subsequent time corresponding to said call made by operating said game start approval button.

5. The control apparatus using the mobile communication terminal according to claim 4, wherein said information service center stores game play information and dispatches said stored game play information corresponding to said call; and
    said control portion receives said dispatched game play information and outputs said received game play information prior to said game play.

6. A control apparatus using the mobile communication terminal according to claim 5 further comprising:
    an identification number input portion for inputting an identification number, wherein said control portion makes said call to the information service center if said input personal information and said input identification number coincides with personal information stored therein in advance and if said game stan approval button is operated.

7. A control apparatus using the mobile communication terminal according to claim 5 wherein said mobile communication terminal makes said input by radio.

8. The control apparatus using the mobile communication terminal according to claim 4, further comprising:
    an identification number input portion for inputting an identification number, wherein said control portion makes said call to the information service center if said input personal information and said input identification number coincides with personal information stored therein in advance and when said game start approval button is operated.

9. A control apparatus using the mobile communication terminal according to claim 4 wherein said mobile communication terminal makes said input by radio.

10. The control apparatus using the mobile communication terminal according to claim 4, wherein said input portion, having a connection port for inserting said mobile communication terminal, reads personal information from said mobile communication terminal inserted into said connection port.

11. A control method using a mobile communication terminal comprising:

an information service center storing a list of subscribers;
a game play portion being separate from rho mobile communication terminal wherein a game is played exclusively on said game play portion and not on the mobile communication terminal, said game play portion having at least a game start approval button, which enables a game play according to personal information;
an input portion, for reading as input personal information exclusively provided by the mobile communication terminal, the personal information identifying a user intending to operate the game play portion; and
a control portion disposed on said game play portion, said control portion identifying the user on the basis of the input of personal information, said control portion thereafter making a call via said mobile communication terminal to the information service center; and
responsive to the user being on the lists of subscribers and said game start approval button being operated, said control portion actuates a game credit switch to enable the game play by said game play portion;
wherein said information service center bills at a predetermined subsequent time corresponding to said call made by operating said game start approval button.

12. The control method using the mobile communication terminal according to claim 11, wherein said input portion, having a connection port for inserting said mobile communication terminal, reads personal information from said mobile communication terminal inserted into said connection pen.

13. A control method, using a mobile communication terminal comprising:
an Internet service provider storing a list of subscribers;
a game play portion being separate from the mobile communication terminal wherein a game is played exclusively on said game play portion and not on the mobile communication terminal, said game play portion having at least a game start approval button, which enables a game play according to personal information;
an input portion, for reading as input personal information exclusively provided by the mobile communication terminal, the personal information identifying a user intending to operate the game play portion;
said mobile communication terminal capable of being connected to the Internet; and
a control portion disposed on said game play portion, said control portion the user on the basis of the input of personal information, said control portion thereafter making call via said mobile communication terminal to the Internet service provider; and
responsive to the user being on the lists of subscribers and said game start approval button being operated, said control portion actuates a game credit switch to enable the game play by said game play portion;
wherein said Internet service provider bills at a predetermined subsequent time corresponding to said call made by operating said game start approval button.

14. The control method using the mobile communication terminal according to claim 13, wherein said input portion, having a connection port for inserting said mobile communication terminal, reads personal information from said mobile communication terminal inserted into said connection port.

15. A control apparatus, using a mobile communication terminal, comprising:
an accounting center storing a list of subscribers;
a coin operable game play portion being separate from the mobile communication terminal wherein a game is played exclusively on said game play portion and not on the mobile communication terminal, said game play portion having at least a game start approval button, which enables a game play according to personal information;
an input portion, for inputting personal information exclusively through the mobile communication terminal; and
a control portion disposed on said game play portion, said control portion identifying the user on the basis of the input of personal information by said mobile communication terminal, said control portion thereafter making makes a call via said mobile communication terminal to the accounting center; and
responsive to the user being on the lists of subscribers and said game staff approval button being operated, said control portion actuates a game credit switch disposed within said game play portion to enable the game play by said game play portion so that said game play portion is operable without the use of coins;
wherein said accounting center bills at a predetermined subsequent time corresponding to said call made by operating said game start approval button.

16. A control apparatus, using a mobile communication terminal, comprising;
an information service center storing a list of subscribers;
a coin operable game play portion being separate from the mobile communication terminal wherein a game is played exclusively on said game play portion and not on the mobile communication terminal, said game play portion having at least a game start approval button, which stores game play information and enables a game play according to personal information;
an input portion, for inputting personal exclusively through the mobile communication terminal; and
a control portion disposed on said game play portion, said control portion identifying the user on the basis of the input of personal information by said mobile communication terminal, said control portion thereafter making a call via said mobile communication terminal to the information service center; and
responsive to the user being on the lists of subscribers and said game start approval button being operated, said control portion actuating a game credit switch disposed within said game play portion to enable the game play by said game play portion so that said game play portion is operable without the use of coins;
wherein said information service center bills at a predetermined subsequent time corresponding to said call made by operating said game start approval button.

17. A control method using a mobile communication terminal comprising:
an information service center storing a list of subscribers;
a coin operable game play portion being separate from the mobile communication terminal wherein a game is played exclusively on said game play portion and not on the mobile communication terminal, said game play pardon having at least a game start approval button, which enables a game play according to personal information;
an input portion, for inputting personal information exclusively through the mobile communication terminal; and
a control portion disposed on said game play portion, said control portion identifying the user on the basis of the input of personal information by said mobile communication terminal, said control portion thereafter making a call via said mobile communication terminal to the information service center; and responsive to the user being on the lists of subscribers and said game start approval button being operated, said control portion actuating a game credit switch disposed within said game play portion to enable the game play by said game play portion so that said game play portion is operable without the use of coins;

wherein said information service center bills at a predetermined subsequent time corresponding to said call made by operating said game start approval button.

18. A control method, using a mobile communication terminal comprising:

an Internet service provider staring a list of subscribers;

a coin operable game play portion being separate from the mobile communication terminal wherein a game is played exclusively on said game play portion and not on the mobile communication terminal, said game play portion having at least a game start approval button, which enables a game play according to personal information;

an input portion for inputting personal information exclusively through the mobile communication terminal, said mobile communication terminal capable of being connected to the Internet; and a control portion disposed on said game play portion said control portion identifying the user on the basis of the input of personal information by said mobile communication terminal, said control portion thereafter making which a call to the Internet service provider; and responsive to the user being on the lists of subscribers and said game start approval button being operated, said control portion actuating a game credit switch disposed within said game play portion to enable the game play by said game play portion so that said game play portion is operable without the use of coins;

wherein said Internet service provider bills at a predetermined subsequent time corresponding to said call made by operating said game start approval button.

* * * * *